United States Patent [19]

Dias et al.

[11] Patent Number: 5,077,346

[45] Date of Patent: Dec. 31, 1991

[54] FUNCTIONALIZATION OF POLYMERIC ORGANOLITHIUM COMPOUNDS BY CARBONATION

[75] Inventors: Anthony J. Dias, Linden; Joseph A. Olkusz, Fanwood, both of N.J.

[73] Assignee: Exxon Chemical Patents Inc., Linden, N.J.

[21] Appl. No.: 416,662

[22] Filed: Oct. 3, 1989

[51] Int. Cl.$^5$ ................................................. C08F 8/00
[52] U.S. Cl. ..................................... 528/383; 525/242; 525/332.8; 525/332.9; 525/333.1; 525/333.2; 525/333.3
[58] Field of Search ............................... 525/389, 242

[56] References Cited

U.S. PATENT DOCUMENTS

| | | | |
|---|---|---|---|
| 3,786,116 | 1/1974 | Milkovich et al. | 260/885 |
| 3,842,146 | 10/1974 | Milkovich et al. | 260/879 |
| 3,890,408 | 6/1975 | Schepers et al. | 260/879 |
| 4,068,050 | 1/1978 | Danzig | 526/21 |

OTHER PUBLICATIONS

Wyman, et al., Journal of Polymer Science, Part A, vol. 2, pp. 4545-4550 (1964).
Mansson, Journal of Polymer Science, Polymer Chemistry Edition, vol. 18, pp. 1945-1956 (1980).
Young, et al., in "Advances in Polymer Science", No. 56, pp. 70-72.
Quirk et al., Makromolecular Chemistry, 183, 2071-2076 (1982).
Quirk and Yin, Polymer Preprints 29, 401-402 (1987).
Macromolecular Reviews, vol. 2, pp. 74-83, Interscience Publishers, Inc. (1967).

Primary Examiner—Bernard Lipman
Attorney, Agent, or Firm—W. G. Muller

[57] ABSTRACT

A method for preparing functionalized polymers formed by anionic polymerization, e.g., polystyrene, polyisoprene, etc., generally comprising the steps of conducting anionic polymerization, reacting the formed polymer with a sterically hindering compound such as 1,1-diphenylethylene, in the presence of a polar diluent, such as tetrahydrofuran, and then contacting the polymer so formed with $CO_2$.

11 Claims, 2 Drawing Sheets

FUNCTIONALIZATION OF POLYMERIC ORGANOLITHIUM COMPOUNDS BY CARBONATION

BACKGROUND OF THE INVENTION

1. Technical Field

The present invention relates to an improved process for end-capping anionic polymers, such as those of styrene, isoprene and butadiene formed by organolithium initiated polymerization including steps of reacting first with a steric hindrance agent such as 1,1-diphenylethylene, and then contacting with carbon dioxide in a solvent containing polar diluent such as tetrahydrofuran.

2. Background Information

Organolithium-initiated, anionic polymerization is a well-known synthetic method of preparing polymers, of such monomers as styrene, isoprene and butadiene, by which the major variables affecting polymer properties can be controlled. Under the preferred operating conditions generally known in the art, spontaneous termination or chain-transfer reactions of the forming polymer can be essentially avoided. This characteristic has led to standard use of the terms "living polymerization" or "living polymers" for such polymerization reactions and the corresponding polymers. Living polymerization allows the preparation of polymers of pre-determined molecular weight, narrow molecular weight distribution ("MWD"), and chain-end functionality. A vast array of synthetic procedures and novel polymers have resulted from the use of these well-characterized, functionalized polymers in grafting, copolymerization, and linking reactions Specifically, the carbonation of living polymeric anions using carbon dioxide is both known and in wide-use. However, as indicated in the prior art, substantial problems in achieving efficient conversion of living polymer to chain-end functionalized polymers without the undesirable formation of reaction by-products, both ketones and alcohols form joined or coupled polymeric chains, have arisen In "Reaction of Polystyryllithium with Carbon Dioxide", Wyman, et al., Journal of Polymer Science; Part A, Vol. 2 pages 4545-4550 (1964), reported that polystyryllithium terminated with gaseous carbon dioxide yielded the polystyrenecarboxylic acid but also di-polystyryl ketone and branched tri-polystyryl carbinol in a 60/28/12 % yield, respectively Mansson in "Reactive of Polystyryl Anions with Carbon Dioxide and Oxygen", Journal of Polymer Science, Polymer Chemistry Edition, Vol. 18, pages 1945-1956 (1980) reported yields of polystyrenecarboxylic acid lower than that reported by Wyman, et al, when the reaction of gaseous carbon dioxid e and polystyryllithium at about 10° C. was conducted in a solvent of mixed methylcyclohexane and tetrahydrofuran (THF), as compared to the benzene solvent of Wyman. The authors cautioned that differing conditions required care in comparison but concluded generally that the ability of THF to dissociate dimeric monomeric species had no "dramatic influence on the yield of carboxylic acid."

Young, et in "Advances in Polymer Science" #56, pages 70-72, noted that use of Lewis bases such as tetrahydrofuran ("THF") served to promote disaggregation of polymeric organolithium species and thus in the presence of an excess of THF, in a 75/25 mixture by volume of benzene a nd T H F, car b o nation of poly (styryl) lithium, poly(isoprenyl)lithium, and poly(styrene-b-isoprenyl)-lithium, reportedly resulted in quantitative suppression of coupling side reactions It is suggested that the amount of THF used by earlier researchers was probably not sufficient to achieve disaggregation. Similar results are reported by Quirk, et al., in "Functionalization of Polymeric Organolithium Compound Carbonation" Makromolecular Chemistry, 183, 2071-2076 (1982). One hundred peroent yields were reported for 75/25 benzene/THF oarbonation solvents. Remarks as to the expressed need for oontaminate-free conditions were later discounted in Quirk and Yin, "Functionalization Reactions of Poly(styryl)-lithium with Carbon Dioxide", Polymer Preprints 29, 401-402 (1987). Carboxylation yields for the earlier report are he re characterized a s having been "essentially quantitative." Both reports teach polymerization at 30° C. under high vacuum conditions with gaseous $CO_2$ introduced after addition of THF, where utilized, into the polymerization reaction vessel The essentially quantitative yields were said to be obtained from freeze-dried solutions of poly(-styryl)lithium.

It is further generally known in the art that certain compounds, including 1,1-diphenylethylene, can be used to modify the subsequent reaction of lithiated polymer chains. U.S. Pat. No. 3,890,408 teaches the use of $CH_2=CR_1R_2$ compounds, including 1,1-diphenylethylene, to modify the terminal dienyl anion of living conjugated diene elastomer polymers for su bsequ ent block polymerization with 1-alkyl-ethylene carboxylic esters, such as methyl methacrylate. The diene elastomer polymers typically include polybutadiene, polyisoprene; copolymerization of butadiene or isoprene with such as styrene is suggested. It is suggested that addition of the 1,1-diphenylethylene serves to create a sterically hindered dienyl anion that no longer is susceptible to secondary reactions, such as reaction with the carbonyl group of the 1-alkyl-ethylene-carboxylic ester, or premature termination and crosslinking.

U.S. Pat. No. 4,068,050 teaches the preparation of macromolecular monomers (from living polymers reacted with "capping agents") for use in condensation type copolymerization reactions. The "capping agents" comprise lower alkylene oxides, 1,1-diphenylethylene, and conjugated dienes such as butadiene and isoprene. These "capping agents" are said to reduce the reactivity of the living polymers so as to allow reaction with a halogen-containing terminating agent of the halogen site rather than at the difunctional carboxylic acid-ester groups, e.g., with diethyl-2-bromo-2 methyl maleate. The terminated living polymer is the macromolecular monomer of the invention, it is comprised of such monomers as styrene, isoprene and butadiene, and is characterized by a Mw/Mn ratio which is not substantially above 1.1.

In view of the many uses for living polymers, particularly those comprised of styrene, isoprene and butadiene, having reactive end-groups capable of subsequent coupling, crosslinking, etc., the need for efficient, cost-effective means of preparation of such polymers is evident. It is thus an object of this invention to provide an improved method of functionalizing polymers produced by living polymerization whereby improved utilization of reactants is achieved while simultaneously minimizing the occurrence of undesirable side reactions and by-products.

SUMMARY OF THE INVENTION

The present invention is a method for preparing functionalized polymers of monomers capable of anionic polymerization generally comprising the steps of:

(A) conducting anionic polymerization of the monomers utilizing at least one of alkali metal hydrocarbons and alkoxide salts in an inert organic diluent;

(B) reacting the polymer formed in step A with a sterically hindering compound in the inert diluent containing additionally an effective amount of a polar diluent; and (C) contacting the reaction product of step B with gaseous $CO_2$ under conditions sufficient to achieve polymers having terminal carboxylic acid functionality on at least 90 wt. percent of the total polymer formed.

DETAILED DESCRIPTION OF THE INVENTION

Figure 1:
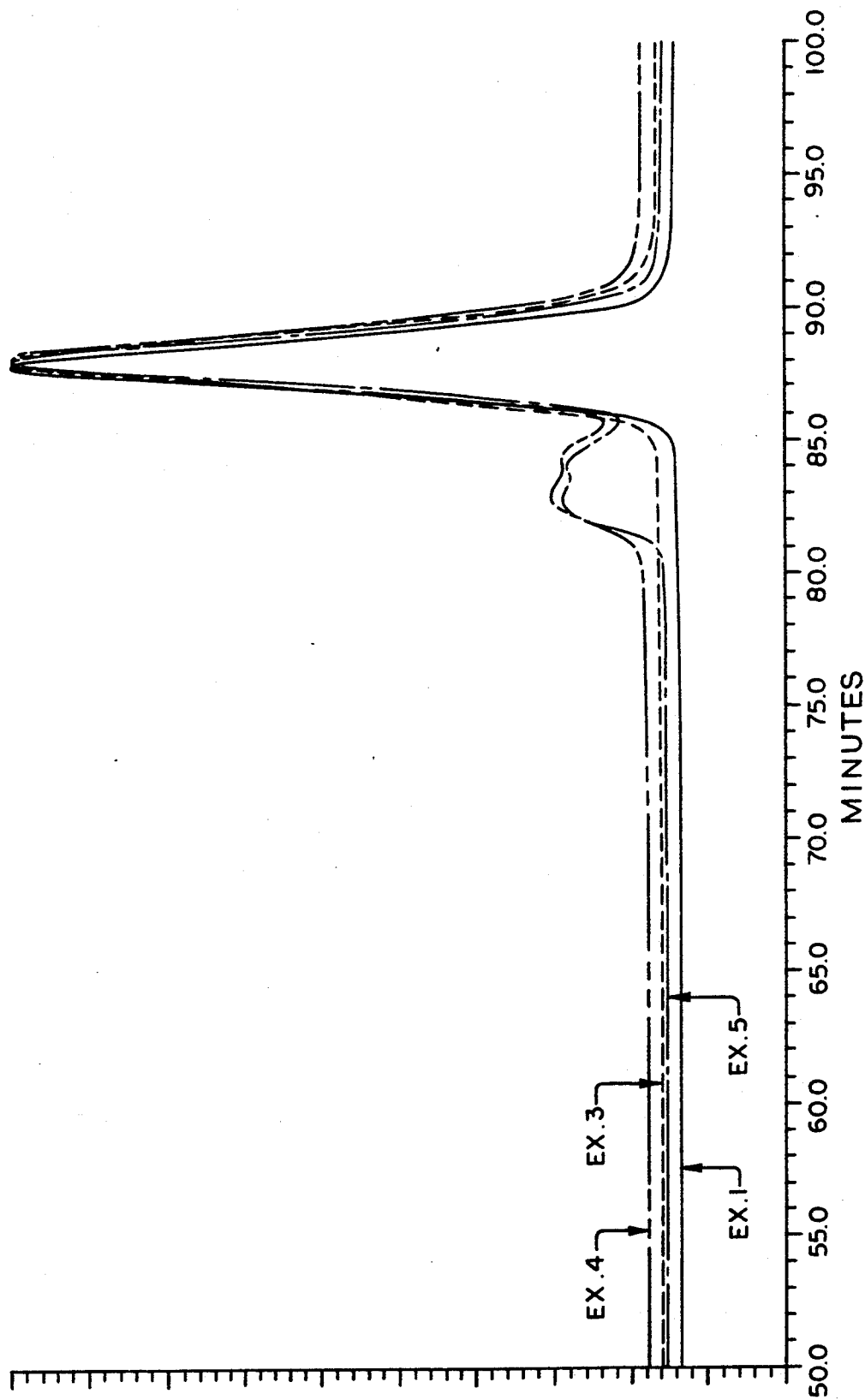
FIG. 1 represents the characterization of carbonated poly(isoprenyl)lithium prepared in accordance with the examples.

The functionalized polymers of this invention can be comprised of the monomers capable of anionic polymerization initiated by organo-metallic compounds in known living polymerization reactions. The living polymers are conveniently prepared by contacting the monomers or combination of monomers with an anionic polymerization initiator in the presence of an inert organic diluent which does not participate in or interfere with a polymerization reaction.

Those monomes susceptible to anionic polymerization are well-known and the present invention contemplates the use of all anionically polymerizable monomers. Preferred anionically polymerizable monomers include vinyl substituted aromatic hydrocarbons containing up to about 12 carbon atoms and conjugated dienes containing 4 to 12 carbon atoms per molecule. Examples of these monomers include styrene, alphamethylstyrene, vinyl toluene and its isomers, isoprene, butadiene and mixtures thereof.

Many other monomers suitable for anionic polymerization are those disclosed in Macromolecular Reviews, Vol. 2, pp. 74-83, Interscience Publishers, Inc. (1967), entitled "Monomers Polymerized by Anionic Initiators" and U.S. Pat. No. 3,786,116, the disclosures of which is incorporated herein by reference.

Non-limiting illustrative species include vinyl aromatic compounds, such as styrene, alpha-methylstyrene, vinyl toluene and its isomers; vinyl unsaturated amides such as acrylamide, methacrylamide, N,N-dilower alkyl acrylamides, e.g., N-N-dimethylacrylamide; acenaphthalene; 9-acrylcarbazole; acrylonitrile and methacrylonitrile; organic isocyanates including lower alkyl, phenyl, lower alkyl phenyl and halophenyl isocyanates, organic diisocyanates including lower alkylene, phenylene and tolylene diisocyanates; lower alkyl and allyl acrylates and methacrylates, including methyl, t-butyl acrylates and methacrylates; lower olefins, such as ethylene, propylene, butylene, isobutylene, pentene, hexane, etc.; vinyl esters of aliphatic carboxylic acids such as vinyl acetate, vinyl propionate, vinyl octoate, vinyl oleate, vinyl stearate, vinyl benzoate; vinyl lower alkyl ethers; vinyl pyridines, vinyl pyrrolidones; dienes including isoprene and butadiene. The term "lower" is used above to denote organic groups containing eight or fewer carbon atoms. The preferred olefinic containing monomers are conjugated dienes containing 4 to 12 carbon atoms per molecule and the vinyl-substituted aromatic hydrocarbons containing up to about 12 carbon atoms.

The initiators for these anionic polymerizations are alkali metal compounds consisting of any alkali metal hydrocarbons and alkoxide salts which produce a mono-functional living polymer, i.e., only one end of the polymer contains a reactive anion. Those catalysts found suitable include the hydrocarbon compounds of lithium, sodium or potassium as represented by the formula RMe wherein Me is an alkali metal such as sodium, lithium or potassium and R represents a hydrocarbon radical, for example, an alkyl radical containing up to about 20 carbon atoms or more, and preferably up to about eight carbon atoms, an aryl radical, an alkaryl radical or an aralkyl radical, Illustrative alkali metal hydrocarbons include ethyl sodium, n-propyl sodium, n-butyl potassium, n-octyl potassium, phenyl sodium, ethyl lithium, sec-butyl lithium, t-butyl lithium and 2-ethylhexyl lithium. Sec-butyl lithium is the preferred initiator because it has a fast initiation which is important in preparing polymers of narrow molecular weight distribution. It is preferred to employ the alkali metal salts of tertiary alcohols, such as potassium t-butyl alkoxylate, when polymerizing monomers having a nitrile or carbonyl functional group.

The alkali metal hydrocarbons and alkoxylates are either available commercially or may be prepared by known methods, such as by the reaction of a halohydrocarbon, halobenzene or alcohol and the appropriate alkali metal.

An inert solvent generally is used to facilitate heat transfer and adequate mixing of initiator and monomer. Hydrocarbons and ethers are the preferred solvents Solvents useful in the anionic polymierzation process include the aromatic hydrocarbons such as benzene, toluene, xylene, ethylbenzene, t-butylbenzene, etc. Also suitable are the saturated aliphatic and cycloaliphatic hydrocarbons such as n-hexane, n-heptane, n-octane, cyclohexane and the like. In addition, aliphatic and cyclic ether solvents can be used, for example, dimethyl ether, diethyl ether, dibutyl ether, tetrahydrofuran, dioxane, anisole, tetrahydropyran, diglyme, glyme, etc. The rates of polymerization are faster in the ether solvents than in the hydrocarbon solvents, and small amounts of ether in the hydrocarbon solvent increase the rates of polymerization.

The amount of initiator is an important factor in anionic polymerication because it determines the molecular weight of the living polymer. If a small proportion of initiator is used, with respect to the amount of monomer, the molecular weight of the living polymer will be larger than if a large proportion of initiator is used. Generally, it is advisable to add initiator dropwise to the monomer (when that is the selected order of addition) until the persistence of the characteristic color of the organic anion is achieved, then add the calculated amount of initiator for the molecular weight desired. The preliminary dropwise addition serves to destroy contaminants and thus permits better control of the polymerization.

To prepare a polymer of narrow molecular weight distribution, it is generally preferred to introduce all of the reactive species into the system at the same time. By this technique, polymer growth by consecutive addition of monomer takes place at the same rate to an active terminal group, without chain transfer or termination reaction When this is accomplished, the molecular weight of the polymer is controlled by the ratio of monomer to initiator, as seen from the following representation:

Molecular weight of living polymer =

$$\frac{\text{Moles of monomer}}{\text{Moles of initiator}} \times \text{Molecular weight of monomer}$$

As it can be seen from the above formula, high concentrations of initiator leads to the formation of low molecular weight polymers, whereas, low concentrations of initiator leads to the production of high molecular weight polymers.

The concentration of the monomer charged to the reaction vessel can vary widely, and is limited by the ability of the reaction equipment to dissipate the heat of polymerization and to properly mix the resulting viscous solutions of the living polymer. Concentrations of monomer as high as 50% by weight or higher based on the weight of the reaction mixture can be used. However, the preferred monomer concentration is from about 5% to about 25% in order to achieve adequate mixing. As can be seen from the formula above and the foregoing limitations on the concentration of the monomer, the initiator concentration is critical, but may be varied according to the desired molecular weight of the living polymer and the relative concentration of the monomer. Generally, the initiator concentration can range from about 0.001 to about 0.1 mole of active alkali metal per mole of monomer, or higher Preferably, the concentration of the initiator will be from about 0 01 to about 0.004 mole of active alkali metal per mole of monomer.

The temperature of the polymerization will depend on the monomer. Generally, the reaction can be carred out at temperatures ranging from about −100° C. up to about 100° C. When using aliphatic and hydrocarbon diluents, the preferred temperature range is from about −10° C., to about 100° C. With ethers as the solvent, the preferred temperature range is from about −100° C. to about 100° C. The polymerization of the styrene is generally carred out at slightly above room temperature: the polymerization of alpha-methylstyrene preferably is carried out at lower temperatures, e.g., −80° C.

The preparation of the living polymer can be carried out by adding a solution of the alkali metal hydrocarbon initiator in an inert organic solvent to a m ixu tre of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to a living polymer as long as the system remains free of impurities which inactivate the anionic species. As pointed out above, however, it is important to add all of the reactive ingredients together rapidly to insure the formation of a uniform molecular weight distribution of the polymer The anionic polymerization must be carried out under carefully controlled conditions, so as to exclude substances which destroy the catalytic effect of the catalyst or initiator. For example, such impurities as water, oxygen, carbon monoxide, carbon dioxide, and the like. Thus, the polymerization are generally carried out in dry equipment, using anhydrous reactants, and under an inert gas atmosphere, such as nitrogen, helium, argon, methane, and the like.

The above-described living polymers are susceptible to further reactions including further polymerization Thus, if additional monomer, such as styrene, is added to the living polymer, the polymerization is renewed and the chain grows until no more monomeric styrene remains. Alternatively, if an another different anionically polymerizable monomer is added, such as butadiene or ethylene oxide, the above-described living polymer initiates the polymerization of the butadiene or ethylene oxide and the ultimate living polymer which results consists of a polystyrene segment and a polybutadiene or polyoxyethylene segment.

A poly(styrene-ethylene) block copolymer can be prepared by contacting living polystyrene with ethylene in the presence of a compound of a transition metal of Groups V-VIII in the periodic table, e.g., titanium tetrachloride. This technique is also applicable to the alpha-olefins, such as propylene. The resulting copolymer is still a living polymer and can be terminated by the methods in accordance to the practice of the present invention.

The above-described living polymers are susceptible to further reactions including further polymerization. For example, different anionically polymerizable monomers than the original anionically polymerizable monomer may be added to the living polymers to form diblock macromolecular monomers These diblock macromolecular monomers are still living polymers Thus, they are susceptible to further functionalization as hereinabove defined and thereafter can be terminated with terminating agents as described in more detail below.

The diblock living polymers can be prepared by contacting the first living polymer e.g., a living polymer of a mono-alkenyl substituted aromatic hydrocarbon such as living polystyrene or living poly(alpha-methylstyrene), with another anionically polymerizable monomer, e.g., a conjugated diene such as butadiene or isoprene In this manner, a living diblock polymer is obtained which can be functionalized by the methods in accordance with the practice of the present invention. Utilizing this technique, a living diblock polymer of the following formula can be obtained:

A−Bθ wherein A is a polymeric block of a mono-alkenyl substituted aromatic hydrocarbon B is a polymeric block of a conjugated diene, and θ is the alkali metal ion, e.g., lithium (Li). The preparation of living polymers having a diblock structure are disclosed in U.S. Pat. No. 3,842,146, the disclosure of which is incorporated herein by reference.

Preferred polymers suitable for grafting onto other polymeric backbone chains for the purpose of preparing graft polymers effective as compatibilizers for polymeric blends that include polystyrene, are living polymers of polystyrene. Prepared by known methods, the living polystyrene is end-capped with $CO_2$ in accordance with this invention to make it suitable for subsequent graft reactions.

Living polymers prepared as described above are reacted with a steric hindering compound, that is a compound that when reacted with the polymeric carbanions will effectively inhibit coupling side reactions, in the presence of a polar diluent The reaction of the steric hindering compound with the polymeric carbanion will occur through the akali metal atom at the living end of the polymer chain. Thus the steric hindering compound will necessarily contain groups that are reactive with the akali metal. Such groups include ethylenic unsaturation, acetylenic unsaturation, sulphur, oxygen and nitrogen. Ethyl enical ly unsaturated groups are preferred, particularly terminal ethylenically unsaturated groups. Groups which will effectively inhibit coupling side reactions include, but are not necessarily limited to, alkyl, alicyclic, aryl and alkaryl hydrocarbon radicals. One or more of the hydrogen atoms in said hydrocarbon radical may, of course, be substituted with a halogen atom. Particularly useful steric hindering compounds are those compounds comprising an ethylenically unsaturated group at one end and two bulky, that is $C_3$ or greater, groups most preferably two pendant cyclic groups, at the other end. The cyclic group may be completely saturated, partially saturated or aromatic. Particularly useful and, hence, preferred steric hindering compounds include the 1,1-substituted ehtylenes, wherein both the 1,1-substituents are cyclic. In general, useful steric hindering compounds containing ethylenic unsaturation, include the 1,1-substituted ethylenes having the following general formula:

wherein $R_1$ and $R_2$ are independently H or the same or different hydrocarbon radicals as mentioned hereinbefore containing from 1 to 20 carbon atoms, with the proviso that at least one of $R_1$ and $R_2$ will contain not less than three carbon atoms Where either $R_1$ or $R_2$ is H, the other should contain at least 7 carbon atoms, preferably at least 9. The most preferred embodiments include 1,1-diphenylethylene and alpha-methyl styrene.

In general, reaction between the steric hindering compound and the active or living polymer will be accomplished in the presence of a polar diluent at a temperature within the range from 0° C. to 200° C. By "polar diluent" it is meant those chemical substances of high dielectric constant within which the steric hindering compounds are soluble, and which are also either solvents for the living polymers or are substantially miscible with solvents for the living polymers. Examples of such polar diluents include tetrahydrofuran (THF), N,N,N,,N,-tetramethylethylenediamine (TMEDA), anisole, dipiperidinoethane, etc., with THF being most preferred. Suitable solvents include any of the solvents known in the prior art to be effective for use during preparation of the living polymers. These include hydrocarbons such as paraffins, cycloparaffins, aromatics and alkyl-substituted aromatics containing from 4 to 10 carbon atoms per molecule. Suitable solvents include, for example, benzene, toluene, cyclohexane, methylcyclohexane, n-butane, n-hexane and n-heptane. Incorporation of an unsaturated steric hindering group could, of course, be accomplished by adding the steric hindering compound during the polymerization reaction, particularly at or near the completion thereof In general, reaction between the living polymer and the steric-hindering compound proceeds stoichiometrically. It will, then, generally be sufficient to combine one mole of steric hindering compound per mole of active site containing an alkali metal atom to be converted. To insure complete conversion, however, a slight excess of steric hindering compound over the stoichiometric amount may conveniently be used.

The use of the polar diluent is particularly important to achieve improved reaction efficiencies. Both time of reaction for the addition of the steric hindering compound as well as the carbonation efficiency for the sterically hindered reaction product thereof are improved The polar diluent is used in amounts of from about 2 to 25 wt. % of the total solvent, that is inert plus polar diluents, more preferably 3-20 wt. %, and most preferably 5-10 wt. %.

The carbonation reaction is then accomplished by contacting the reaction product of the living polymer and the steric hindering compound with $CO_2$ under conditions sufficient to achieve polymers having terminal carboxylic acid functionality of at least 90 wt. % of the total formed. Such conditions typically involve the introduction of gaseous $CO_2$ into the reaction mixture containing the sterically hindered polymer chains at temperatures below about 20° C. The lower temperature limit will depend upon the depressed freezing point of the reaction solvent mix. The reaction pressure for this reaction is not critical, thus it can be suitably conducted at atmospheric pressure, as well as above or below.

Thus where the preferred solvents for polystyrene will include cyclohexane or benzene, carbonation reaction temperatures between about 0° C. and 18° C. will be most suitable. Where solvents are linear aliphatics such as hexane or heptane or substituted-benzene aromatics, such as toluene, etc., for such compounds as polyisoprene, carbonation temperatures between as low as about −50° C. to about 18° C. will be most suitable Where the inert diluent is one selected in accordance with knowledge in the art as appropriate for living copolymer and block polymers, the carbonation reaction temperature will typically be within the range inclusive of −50° C. to 18° C. It is important not to exceed about 20° C., preferably about 18° C., for the carbonation reaction so as to avoid broadening of the molecular weight distribution beyond about 2.0 for the polymer product. This broadening is indicative of the competing coupling of polymer chains that can be substantially avoided by the practice of this invention.

It is also important for the effective utilization of this invention that all reagents, solvents, diluents, etc., are substantially free of such contaminants as elemental oxygen and water. These contaminants react competitively to the $CO_2$ with the alkali metal of the polymeric anion and accordingly reduce the efficiency of the carbonation reaction. For the same reason the carbonation reaction should be conducted in an inert atmosphere.

By performing the invention process as described above carbonation efficiencies of at least about 90% are achieved, efficiencies above about 93% and most preferably above about 95 wt. % are likewise achieved.

The preparation of the functionalized polymers of this invention are illustrated by the following examples. These examples are intended only to illustrate the invention and not in any sense to limit the manner in which the invention can be practiced.

General Comments: All reactions and reagents were handled under a inert atmosphere of nitrogen with careful exclusion of both oxygen and water. The monomers were purified by distillation, within a day of polymerization, from dibutylmagnesium. The solvent (heptane, cyclohexane, or tetrahydrofuran) was purified the day of the polymerization by distillation under nitrogen of 25% of the total volume or alternatively by vacuum distillation from butyllithium. The monomer was added to the solvent just prior to use. 1,1-diphenylethylene was purified by vacuum distillation from dibutylmagnesium. The purified 1,1-diphenylethylene was stored in cyclohexane or tetrahydrofuran solution as a mixture of 1,1-diphenylethylene and a small amount of lithium salt (Butyllithium was added to the solution until the characteristic red color is formed; the deep red color is a good indicator of the purity of the solution). All glassware, syringes and needles were oven dried at 150° C. for 3 hours. The hot glassware was cooled and assembled under inert atmosphere usually in a dry box.

Example 1: Carbonation of Poly(isoprenyl)lithium in Heptane Using 1,1-Diphenylethylene and Carbon Dioxide in THF:

A three liter round bottom flask was fitted with a reflux-takeoff head and a adapter containing a stopcock and serum stopper. The flask was charged with 2.75 liters of heptane. The heptane was distilled until 2 liters remained, then the flask was allowed to cool to 40° C. before isoprene (200 g, 300 ml) was added. The flask was placed in a hexane bath to aid in the regulation of the temperature. The polymerization was initiated by adding 2.5 ml s-butyllithium (1M in hexane). The temperature of the bath rose to 50° C. and the viscosity increased rapidly. After 4 hours, a solution of 1,1-diphenylethylene in THF was added (50 ml of 0.05 g/ml solution). A bright orange-red color immediately appeared. The flask was then ooled to −10° and reagent grade carbon dioxide was bubbled Lnto the flask. The color was discharged instantaneously with mixing. The resulting polymer was neutralized with dilute HCL (3 ml conc. HCL, 7 ml H$_2$O, 50 ml THF) and coagulated in isopropanol. The resulting polymer had a narrow molecular weight distribution ($M_w$=74 k, $M_n$=68 k) with a carbonation efficiency of about 90%, as measured by GPC analysis.

Example 2: Carbonation of Poly(styryl)lithium in Cyclohexane Using 1,1-Diphenylethylene and Carbon Dioxide in THF.

A 500 ml cylindrical glass reaction flask which was equipped with a high-vacuum stopcock and serum stopper was charged with 300 ml of distilled cyclohexane. Then styrene (68 g) was added to the flask via double ended needle. The flask was placed in a water bath to aid in the regulation of the temperature. The polymerization was initiated by adding 1.5 ml butyllithium (1M in hexane). The temperature of the bath rose to 50 C and the viscosity increased rapidly. After 4 hours, a solution of 1,1-diphenylethylene in THF was added (25 ml of 0.05 g/ml solution). A bright ruby-red color immediately appeared. The flask was then cooled to 10° C. and reagent grade carbon dioxide was bubbled into the flask. The color was discharged instantaneously upon thawing and with mixing. The resulting polymer was neutralized with dilute HCl (3 ml conc. HCl, 7 ml H$_2$O, 50 ml THF) and coagulated in isopropanol. The resulting polymer had a narrow molecular weight distribution ($M_w$=12, $M_n$=10 k) with a carbonation efficiency of about 90% (as measured by GPC analysis).

Comarative Example 3. Carbonation of Poly(isoprenyl)lithium in the Presence of THF without 1,1-Diphenylethylene.

Isoprene was polymerized in heptane as in example 1. After 4 hours, the flask was cooled to 0° C. and 30% THF was added. The flask immediately assumed a yellow color. Carbon dioxide was bubbled in and the polymer was neutralized and isolated as in example 1. The polymer had a narrow molecular weight distribution but the extent of carbonation was only about 70% (as measured by GPC analysis).

Comparative Example 4. Carbonation of Poly (isoprenyl)lithium in Heptane Without THF or 1,1-Diphenylethylene.

The polymerization of isoprene was conducted as in example 1. The solution was cooled to 0° C. and carbon dioxide was introduced. The polymer was neutralized and isolated as in example one. The polymer obtained in this example had a clearly multimodal distribution in the GPC and the extent of carbonation was less than 50% (as determined by GPC analysis).

Comparative Example 5: Carbonat ion o f Poly(isoprenyl)lithium in Heptane at 0° C. in the Presence of 1,1-Diphenylethylene without THF.

Isoprene was polymerized in heptane as in Example 1. After 4 hours, a solution of 1,1 diphenylethylene in heptane (50 ml, 0.05 g/ml) was added to the flask. The reaction temperature was kept at 50° C. for 2 hours, then cooled to 0° C. The reaction was kept at 0° C. for 15 minutes before carbon dioxide was introduced. The polymer was neutralized and isolated as in Example 1. The polymer had a narrow molecular weight distribution but contained approximately 15% coupled products by GPC analysis (see FIG. 1).

Comparative Example 6: Carbonation of Poly(isoprenyl)lithium in Heptane at 25° C. in the Presence of 1,1-Diphenylethylene without THF.

Isoprene was polymerized in heptane as in Example 1. After 4 hours a solution of 1,1 diphenylethylene in heptane (50 ml, 0.05 g/ml) was added to the flask. The reaction temperature was kept at 50° C. for 2 hours, then cooled to 25° C. The reaction was kept at 25° C. for 15 minutes before carbon dioxide was introduced. The polymer was neutralized and isolated as in Example 1. The polymer had a narrow molecular weight distribution but contained approximately 20% coupled products by GPC analysis.

Example 7: Characterization of Poly(isopenyl)-carboxylates through GPC of Graft Copolymers.

Direct analytical techniques are not currently available which can accurately distinguish between high molecular weight end-functionalized polymers and unfunctionalized polymers. FIG. 1, however, does show a direct characterization of the suppression of coupling side reactions. Example 1, in accordance with the claimed invention, shows a sharp peak (i.e., narrow molecular weight distribution) at about 88 min. retention time. In contrast, examples 4 and 5 show additional peaks at about 84 minutes and 82 minutes which are representative of the additional formation of dimer and trimer products, respectively. Example 3 also shows a sharp peak at about 88 minutes indicating a suppression of coupling side reactions as with Example 1.

Figure 2:
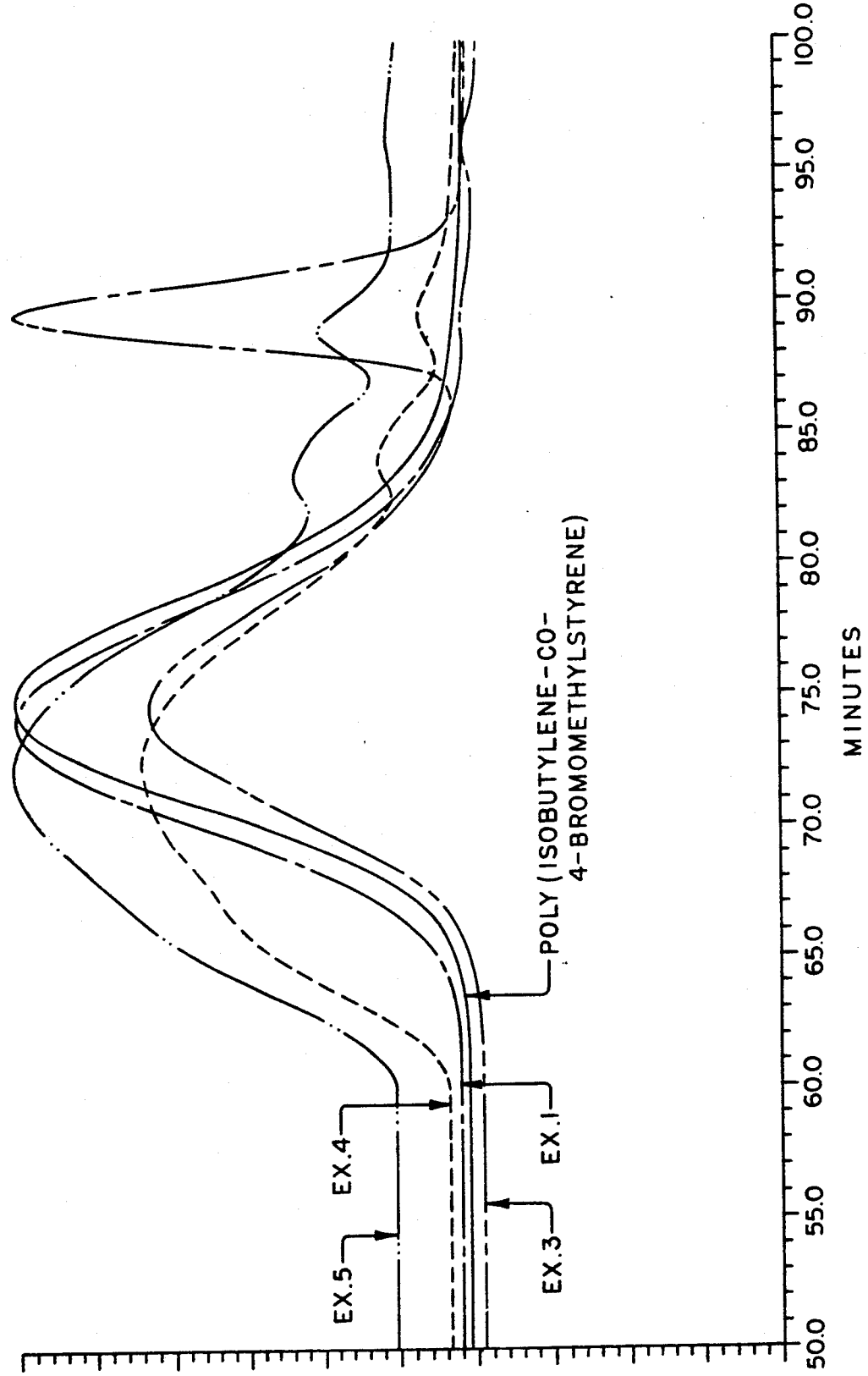
FIG. 2 represents the characterization of graft polymers prepared by reacting carbonated anionic polymers, prepared in various manners, with a reactive second polymer. The characterizations were accomplished by GPC (gel permeation chromotography) analysis of the polymers and polymer products formed.

An indirect technique, which is strongly believed to be accurate to show carbonation efficiency, is to use the end-functionalized polymers in graft reactions and characterize the resulting reaction product for the amount of unreacted polymer (FIG. 2). Poly(isoprenyl)-carboxylic acid was prepared as in Examples 1, 3, 4 and 5. A heptane solution containing the poly(isoprenyl)-carboxylic acid was treated with tetrabutylammonium hydroxide (10 ml, 1M in methanol) and BHT (2 g). This solution was then added to a 1 liter flask containing a heptane solution of poly(isobutylene-co-4-bromomethylstyrene) (22.5 g in 500 ml). This copolymer can be produced in a manner such as that set forth in U.S. patent application Ser. No. 07/199,665, filed on May 27, 1988. The flask was heated to 70° C. and the mixture was reacted for 4 hours. The solution was then placed in a teflon tray and the solvent was removed in vacuum. FT-infrared analysis of thin films indicated that all the carboxylate groups present in each of the samples were converted into the ester form. GPC analysis of THF solutions (3 mg/ml) of the graft copolymers conducted on a Waters 150 GPC at 0.5 cc/min are shown; the peaks at about 88 minutes correspond to the amount of unfunctionalized polyisoprene, the peak at about 84 minutes corresponds to the dimeric polyisoprene ketone (which also does not graft). This data is extremely useful for distinguishing between samples which both had narrow distributions (Examples 1 and 3); both have nearly identical molecular weight distributions (FIG. 1) and are substantially free of coupled products; however, poly(isoprenyl)carboxylate prepared as in Example 3 clearly has significant levels of unfunctionalized polyisoprene.

What is claimed is:

1. A method for preparing functionalized polymers of monomers selected from the group consisting of styrene, alphamethylstyrene, vinyl toluene and its isomers, isoprene, butadiene and mixtures thereof comprising:
   (A) reacting a living, alkali metal compound initiated polymer with a sterically hindering compound selected from the group consisting of 1,1-diphenylethylene and alphamethylstyrene in the presence of an effective amount of a polar diluent;
   (B) contacting the reaction product of step A with gaseous $CO_2$ at a temperature less than 20° C.

2. The process according to claim 1 wherein the temperature range is between −50° C. and 18° C.

3. The process according to claim 1, wherein said polar diluent is tetrahydrofuran.

4. The process of claim 3, wherein the polar diluent is present in an amount equal to 2–25 weight percent of the total solvent.

5. A method for preparing functionalized polymers of monomers selected from the group consisting of styrene, alphamethylstyrene, vinyl toluene and its isomers, isoprene, butadiene and mixtures thereof comprising the steps of:
   (A) Conduct anionic polymerization of the monomers utilizing at least one of alkali metal hydrocarbons and alkoxide salts in an inert organic diluent;
   (B) Reacting the polymer formed in step A with a sterically hindering compound selected from the group consisting of 1,1-diphenylethylene and alphamethylstyrene in the inert diluent containing an effective amount of a polar diluent; and
   (C) Contacting the reaction product of step B with gaseous $CO_2$ under conditions sufficient polymers having terminal carboxylic acid functionally on at least 90 wt. percent of the total polymer formed.

6. The process according to claim 5, wherein the contacting with gaseous $CO_2$ is performed at a temperature less than 20° C.

7. The process according to claim 7 wherein the temperature range is between −50 C and 18° C.

8. The process according to claim 5, wherein said polar diluent comprises tetrahydrofuran or N,N,N',N'-tetramethylethylenediamine.

9. The process of claim 5, wherein the polar diluent is present in an amount equal to 2–25 weight percent of the total solvent.

10. The process of claim 11, wherein the polar diluent is present in an amount equal to 2–25 weight percent of the total solvent.

11. A method for preparing functionalized polystyrene comprising the steps of:
    (A) Conducting anionic polymerization of styrene utilizing sec-butyllithium in an inert organi diluent;
    (B) Reacting the polymer formed in step A with 1,1-diphenylethylene in the inert diluent containing 5–10 weight percent of tetrahydrofuran; and
    (C) Contacting the reaction product of step B with gaseous $CO_2$ at a temperature of 0–18° C. so as to form polystyrene polymers having terminal carboxylic acid functionally on at least 90 wt. percent of the total polymer formed.

* * * * *